3,122,513
CONCRETE COMPRISING LEAD MATTE AND CALCIUM ALUMINATE CEMENT
John P. Dempsey, El Paso, Tex.
(22—40 77th St., Jackson Heights, N.Y.)
No Drawing. Filed Jan. 14, 1960, Ser. No. 2,330
3 Claims. (Cl. 252—478)

The present invention relates to concrete, particularly of the character which is useful for radiation shielding such as biological shielding and for other purposes.

A purpose of the invention is to produce a concrete of unusually good mechanical properties which is effective as a radiation shield, especially for biological shielding.

A further purpose is to produce a concrete of improved strength and density, which is especially resistant to sea water.

A further purpose is to provide lead matte as the aggregate for concrete and to protect against damage to the bond of the concrete by employing calcium aluminate cement which does not seriously attack the lead matte in the way that Portland cement acts.

Further purposes appear in the specification and in the claims.

In the prior art attempts have been made to produce concrete which is effective as radiation shielding by bonding metallic particles such as lead shot by Portland cement. This material is prohibitively expensive, and has such poor mechanical properties that it cannot be used effectively as a load-bearing element in a structure.

The present invention is designed to produce improved concretes which are of high mechanical properties and are effective as radiation shields.

The invention also produces a very high strength concrete which has other advantageous properties, such as great resistance to sea water, footings for heavy machinery and coatings for pipe lines used under water.

The invention is expected to have application wherever shielding is required, particularly to protect human beings or other animals or biological materials from radiation, including X-rays, gamma rays, and neutrons. While the concrete of the invention is expected to find wide application in forming load-bearing walls and other structural elements of X-ray rooms for hospitals and for industrial X-rays, the invention is also applicable to form components of cyclotrons, nuclear chain reactors and isotope laboratories and production facilities.

As compared to ordinary concrete, four inches of the concrete of the invention has substantially the same protection against X-rays and gamma rays as nine inches of ordinary concrete.

One of the great advantages of the invention is that the concrete of the invention holds much more chemically combined water than concrete made from Portland cement, and therefore is much more effective in shielding against neutrons. This makes the concrete of the invention especially useful in shielding nuclear chain reactors.

The concrete of the invention recommends itself particularly also for under-water uses where strength and water resistance are required, such as coating under-water pipe lines and under-water structural piles and foundations. The concrete of the invention is much less attacked by sea water than concrete made using ordinary aggregates with Portland cement.

The aggregate used in the present invention is so-called lead matte or lead bearing matte. This is largely a product of battery smelting, and is available in large quantities in connection with lead smelters.

The so-called lead matte of industry is essentially a complex sulphide of lead and iron, with minor quantities of other metals. It normally contains between 6 and 20 percent of lead and between 45 and 60 percent of iron, with variable quantities of copper, antimony and bismuth.

A typical analysis of lead matte is as follows:

| | Percent |
|---|---|
| Lead | 8 |
| Iron | 59 |
| Antimony | 2.7 |
| Copper | 1.1 |
| Bismuth | 0.1 |
| Lime | 0.5 |
| Sulphur | 23 |
| Insoluble | 0.5 |

Balance other metallic sulfides and sulphates such as zinc, tin, silver and the like.

The aggregate when made into concrete in accordance with the present invention produces a concrete which has a density of around 300 pounds per cubic foot, as compared with a density for concrete made with sand and gravel aggregate and Portland cement of about 140 to 150 pounds per cubic foot.

The aggregate is preferably crushed and screened to produce a mass of maximum density. In experiments carried on in the present invention, coarse and fine aggregates are made as follows:

COARSE AGGREGATE

| Screen size— | Percent passing |
|---|---|
| ¾″ | 100 |
| ½″ | 46 |
| ⅜″ | 10 |
| 4 mesh | 0 |

FINE AGGREGATE

| Screen size— | Percent passing |
|---|---|
| 4 | 100 |
| 16 | 46 |
| 50 mesh | 17 |
| 100 mesh | 8 |

In the above tables the percentage passing is determined by weight. The mesh size is Tyler Standard mesh per linear inch.

Experiments were made in blends of the coarse and fine aggregate to produce maximum density, and it was found that the maximum density is obtained in the mixes referred to below using 52 percent by weight of coarse aggregate and 48 percent by weight of fine aggregate. The aggregate alone before mixing the cement when combined in this manner had a density of 226 pounds per cubic foot.

The cement used in bonding the aggregate in accordance with the invention is calcium aluminate cement (available commercially in various forms one of which is called Lumnite cement) the analyses of which vary somewhat from month to month. A typical average yearly analysis of calcium aluminate (Lumnite) cement is s follows:

| Insoluble Residue, percent | (SiO₂) Silica, percent | (FeO) Iron Oxide, percent | (Fe₂O₃) Black or Magnetic Oxide of Iron, percent | (Al₂O₃+ TiO₂) Alumina plus Titanium Oxide, percent | (CaO) Lime, percent | (MgO) Magnesium Oxide, percent | (SO₃) Sulphur Trioxide, percent |
|---|---|---|---|---|---|---|---|
| 0.53 | 9.6 | 5.3 | 5.3 | 41.5 | 36.4 | 1.2 | 0.17 |

The quantity of titanium oxide is very small.
The analysis may be in the following range:

| | Percent |
|---|---|
| Alumina | 35 to 45 |
| Lime | 30 to 40 |
| Silica | 5 to 15 |
| Iron oxide calculated as Fe₂O₃ | 5 to 15 |

In making up concrete mixes in accordance with the invention, the aggregate coarse and fine particles were combined to give the maximum density and then the concrete was mixed in a Lancaster open tub mixer using the following procedure: the aggregate was weighed and placed in the mixer tub with a portion of the mixing water, and the water and the aggregate were mixed for about one minute. Then the cement was added and the balance of the mixing water was added and the concrete was mixed for one and one-half minutes.

The quantity of water was regulated to give a vibrating consistency too stiff to show any slump. The concrete thus mixed was placed in the mold in one layer and vibrated.

The specimens while in the molds were cured in a fogroom for 24 hours and then removed from the molds. Three prisms formed of concrete according to the invention from each one of the mixes were replaced in the fogroom until they were tested as described above for compression and flexure at the end of 1, 3 and 28 days. One other prism of each mix was stored in the fogroom. Another prism of each mix was stored in water. Another prism of each mix was stored outdoors buried horizontal with one cast surface exposed above the ground. The prisms which were stored in the fogroom were removed at the age of one month and placed in air storage.

Example 1

Test blocks, cubes and prisms, were made of a concrete mix containing two parts of lead matte aggregate of maximum density above referred to and one part calcium aluminate cement by volume. The proportions by weight were 4.8 parts of lead matte aggregate to one part calcium aluminate. The ratio of water to cement was 3.52 gallons of water to one standard bag of cement.

Typical test results obtained are as follows:

Compressive strength, p.s.i., average 2–3″ cubes—
  After 1 day aging _____ 6161
  After 3 days aging _____ 9889
  After 28 days aging _____ 12361

Flexural strength, p.s.i., 1 break 3″ prism—
  After 1 day aging _____ 767
  After 3 days aging _____ 1273
  After 28 days aging _____ 1193

The density of the blocks was 300 pounds per cubic foot.

It will be evident that the concrete is approximately half as strong in compression as the design figure commonly used for structural steel.

It has good resistance against elevated temperature and this is valuable in shielding of nuclear reactors where a great deal of heat is present.

Example 2

The procedure of Example 1 was followed out except that 5.25 parts by volume of lead matte aggregate was used to one part by volume of calcium aluminate cement, or 12.6 parts of lead matte aggregate particles to 1 part of calcium aluminate cement by weight. The water used in this example was 5.33 gallons per bag of cement.

The following mechanical properties were determined by test:

Compressive strength, p.s.i., average of 2–3″ cubes—
  After aging 1 day _____ 2966
  Agter aging 3 days _____ 5444
  After aging 28 days _____ 7695

Flexural strength, p.s.i., 1 break of a 3″ prism—
  After aging 1 day _____ 537
  After aging 3 days _____ 897
  After aging 28 days _____ 1067

The proportions of aggregate to cement by volume may vary between 1 to 1 on the rich side and 10 to 1 on the lean side.

In view of the excellent strength of the concrete of the invention and the fact that it is much more effective as a radiation shield than ordinary concrete, it will be evident that relatively thin shielding walls can be made which still will be adequate to support the structure and act as load bearing elements. Thus ordinary concrete has a compressive strength of 2500 pounds per square inch. A shield of ordinary concrete 36 inches thick, 12 inches wide and of nominal height will support a compressive load of 1,080,000 pounds. A shield of the present invention of Example 1 which is 4/9 as thick will support a compressive load of 2,304,000 pounds, or more than twice as much as the ordinary concrete.

Example 3

An effort has been made to produce lead matte concrete using Portland cement in the various standard proportions. An undefined chemical action takes place and the Portland cement does not harden.

An effort has been made to explain why the Portland cement fails to harden when lead matte is used as an aggregate.

Without attempting this as a complete explanation, but merely setting it forth as a possible theory, it appears that the slurry formed by the Portland cement in mixing the concrete is sufficiently alkaline to leach the iron sulfide from the lead matte. This leaching produces very complex and somewhat unpredictable reactions which causes the Portland cement to remain unhardened. Some investigators attribute the failure of the Portland cement to harden to the presence of sulfur in the form of sulfides.

In the case of the calcium aluminate cement, the alkalinity is less pronounced and the water of hydration reacts much more rapidly than in the case of Portland cement, so that the leaching of the iron sulfide is negligible. In fact, in the concrete of the present invention the calcium aluminate cement achieves 75 to 80 percent of its maximum strength overnight.

It will be evident that by the present invention it is possible to make blocks or bricks and also to cast structural elements which may be important load-bearing members such as walls in radiation shields such as X-ray rooms, nuclear reactors, pipe-coating for radio-active liquids and gases, and the like.

It will further be evident that the invention is desirable for under-water uses such as under-water pipe-coacting.

One of the great advantages of the invention is that the concrete of the invention is less expensive than existing shielding grids, or other sources of heavy concrete made from mineral aggregates. This feature, combined with a great saving in space and great strength recommends it particularly for shielding on atomic powered vehicles such as ships.

All percentages of material are by weight.

In view of my invention and disclosure variations and modifications to meet individual whim or particular need will doubtless become evident to others skilled in the art, to obtain all or part of the benefits of my invention without copying the method and apparatus shown, and I therefore, claim all such insofar as they fall within the reasonable spirit and scope of my claims.

Having thus described my invention what I claim as new and desire to secure by Letters Patent is:

1. Concrete comprising an aggregate composed of lead matte in combination with calcium aluminate cement bonding together the matte.

2. Concrete composed of an aggregate of lead matte and calcium aluminate cement, the proportions of lead matte to calcium aluminate cement by volume being in the range between 1 to 1 and 10 to 1.

3. The method of making concrete which is effective as a radiation shield, which comprises mixing between 1 and 10 parts by volume of lead matte particles with 1 part by volume of calcium aluminate cement in the presence of water and forming the concrete into a shape.

References Cited in the file of this patent

UNITED STATES PATENTS

| | | |
|---|---|---|
| 1,142,989 | Sparkman et al. | June 15, 1915 |
| 2,019,981 | Krauss | Nov. 5, 1935 |
| 2,726,339 | Borst | Dec. 6, 1955 |
| 2,748,099 | Bruner | May 29, 1956 |

OTHER REFERENCES

Henrie: "Properties of Nuclear Shielding Concrete," Journal of the American Concrete Institute, July 1959, pp. 37 to 43.